Sept. 14, 1926. 1,599,472
F. KOCH
SIDE BEARING FOR ARTICULATED CARS
Filed Jan. 16, 1925 2 Sheets-Sheet 1

Patented Sept. 14, 1926.

1,599,472

UNITED STATES PATENT OFFICE.

FELIX KOCH, OF PITTSBURGH, PENNSYLVANIA, ASSIGNOR TO PRESSED STEEL CAR COMPANY, OF PITTSBURGH, PENNSYLVANIA, A CORPORATION OF NEW JERSEY.

SIDE BEARING FOR ARTICULATED CARS.

Application filed January 16, 1925. Serial No. 2,838.

This invention relates to railway transportation cars and particularly to railway cars of the articulated unit type, in which each unit comprises a plurality of car bodies, the adjacent ends of two of which are carried by a single truck, and has for an object the provision of side supports or bearings between the truck and the adjacent ends of two of the bodies of a car unit.

Another object of the invention is to provide side bearings for an articulated car unit, each of which bearings comprises a yieldably mounted member adapted to engage the adjacent ends of two of the bodies of said unit, and one of the car trucks.

A further object of the invention is to provide a side bearing for an articulated car unit, such bearing having spaced shoe members mounted on the truck, each of which members is adapted to engage one end of one of the bodies of such car unit.

These and other objects will be apparent from the following description.

Figure 1:
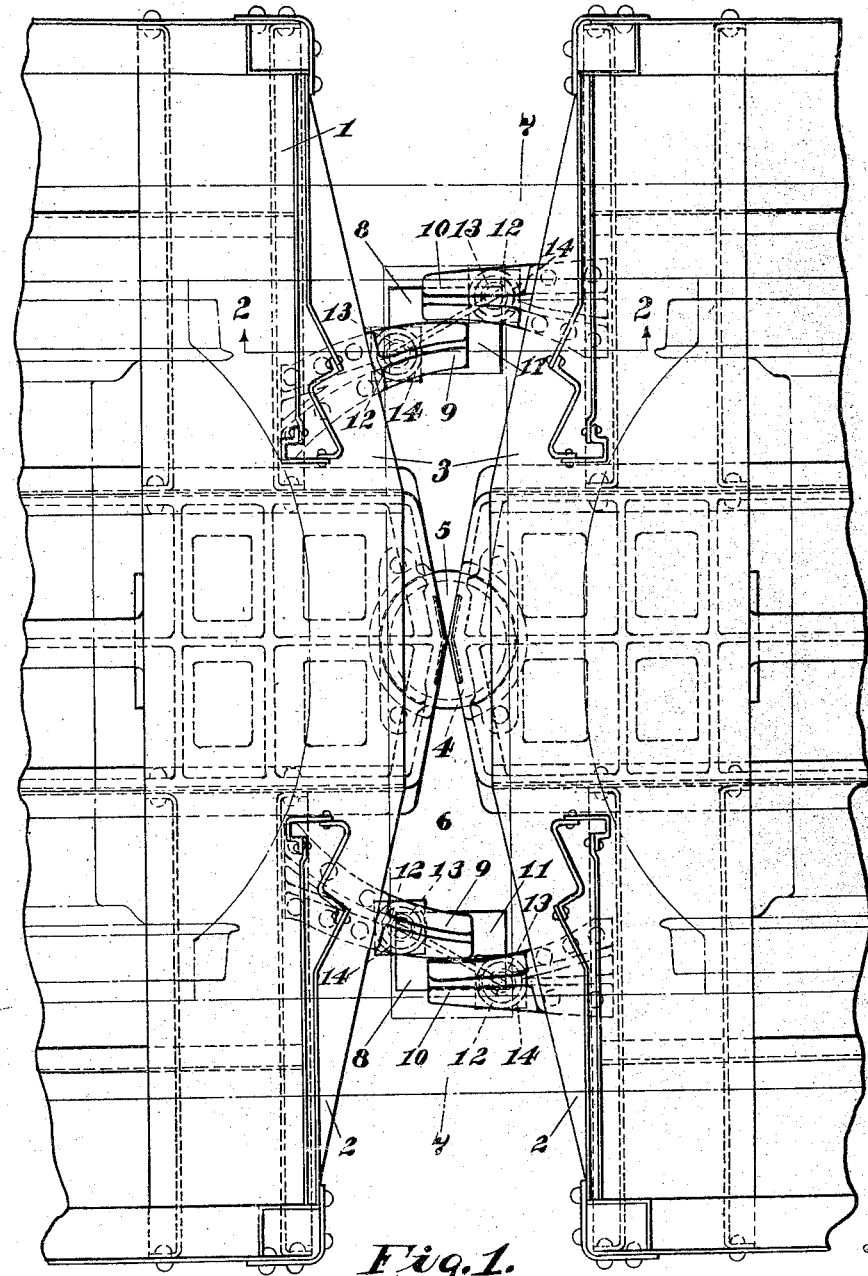
Figure 2:
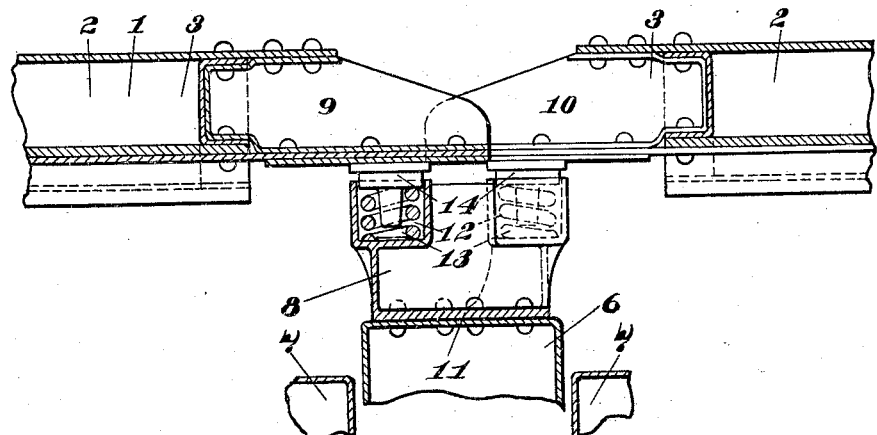
Figure 3:
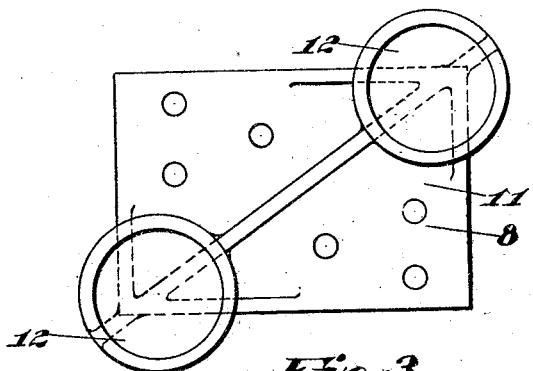
Figure 4:
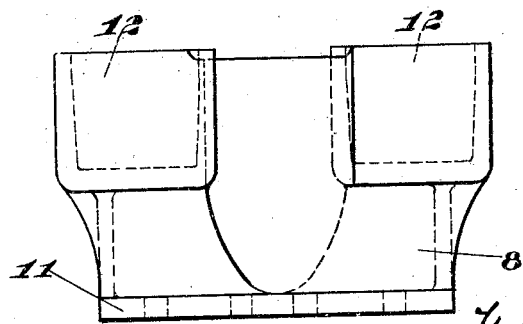

Referring to the drawings in which like reference characters refer to like parts, Fig. 1 is a plan view of portions of the adjacent ends of two car bodies of the car unit. Fig. 2 is a longitudinal sectional view taken on the line 2—2 of Fig. 1. Fig. 3 is an enlarged detail view of the side bearing member, the shoe members and resilient members being omitted, and Fig. 4 is a side elevational view of the same.

Referring now in detail to the drawings the reference character 1 indicates an articulated car unit which comprises a plurality of car bodies 2, the adjacent end portions 3 of two of which have been shown in the drawings. These ends 3 are provided with body center plates 4, both of which engage a truck center plate 5 mounted on a truck bolster 6, which bolster is a part of the truck 7. These center plates 4 and 5 are so formed that they engage with each other in such a manner as to permit the bodies 3 of the unit to move freely relative to each other and to the truck as the car unit rounds a curve or when the bodies sway from side to side. On each side of the longitudinal center line of the truck 7 a truck side bearing 8 is provided, which is secured preferably to the top of the bolster 6.

Above the truck side bearings each of the adjacent ends 3 of adjacent underframes is provided with body side bearings which extend outwardly from such ends and are adapted to engage with the truck side bearings. These body side bearings are indicated by the reference characters 9 and 10, the side bearings 9 being secured to the end portion of one of the bodies and the side bearings 10 being secured to the end portion of the adjacent body. These side bearings 9 and 10 are preferably of such a length that they overlap each other and are so formed and spaced transversely of the body that they do not contact with each other as the bodies swivel.

Each of the truck side bearings 8 comprises a member 11 which is secured to the bolster 6 and extends upwardly therefrom. In the upper portion of this member spaced recesses or pockets 12 are provided, which open upwardly. Within each of these pockets a spring 13 is seated, and on the upper end portion of the spring a shoe member 14 is mounted, a portion of such shoe extending into the recess. This shoe is adapted to slidably engage one of the body side bearings and is movable vertically relative to the member 8. As the shoes 14 are freely movable or adjustable in a vertical direction, and as the springs 13 tend to force the shoes upwardly at all times, there will be a proper bearing maintained between the truck and car bodies at all times and under all service conditions.

I am aware that many changes may be made in the details of my invention without departing from the spirit and scope of the appended claims.

Having thus described the invention what I claim as new and desire to secure by Letters Patent is:—

1. In a railway car comprising a plurality of bodies, a truck for supporting the adjacent ends of said bodies, a truck bolster and an adjustable side bearing for said bodies between said bodies and said bolster.

2. In a railway car comprising a plurality of bodies, movable relative to each other, a truck supporting the adjacent ends of said bodies, and an adjustable side bearing for said bodies on said truck, said side bearing being common to both of said bodies.

3. In a railway car comprising a plurality of bodies, a truck for supporting the adjacent ends of said bodies, said bodies and truck being adapted to swivel relative to each other, a truck bolster and an automatically adjustable side bearing for said bodies between said bodies and bolster.

4. In a railway car comprising a plurality of bodies adapted to swivel relative to each other, a truck supporting the adjacent ends of said bodies and adapted to swivel relative to said bodies, and a side bearing for said bodies mounted on said truck and automatically adjustable in a vertical direction, said side bearing being common to both of said ends.

5. In a railway car comprising a plurality of bodies, a truck supporting the adjacent ends of two of said bodies, a side bearing on said truck having loosely mounted shoe members adapted to be engaged by said bodies.

6. In a railway car comprising a plurality of bodies, a truck supporting the adjacent ends of two of said bodies, and a side bearing on said truck having a plurality of yieldably mounted shoes each of said shoes being adapted to be engaged by one of said bodies.

7. In a railway car comprising a plurality of car bodies, a truck supporting the adjacent ends of two of said bodies, a side bearing on said truck, side bearings on said bodies, and means for adjusting said truck and body side bearings relative to each other.

8. In a railway car comprising a plurality of bodies, a truck supporting the adjacent ends of two of said bodies, a body side bearing on each of said bodies, and a truck side bearing on said truck being adapted to cooperate with the body side bearings, said truck side bearing comprising a base member having spaced pockets formed therein, a spring in each of said pockets, and a shoe member mounted on each spring, adapted to be engaged by one of said body side bearings.

9. In a railway car comprising a plurality of bodies, side bearings secured to and extending outwardly from the adjacent ends of two of said bodies, a truck, and a side bearing on said truck adapted to yieldably engage with the first mentioned side bearings.

10. In a railway car comprising a plurality of bodies, a truck supporting the adjacent ends of two of said bodies, side bearings secured to said ends and extending outwardly therefrom, and a yieldable side bearing on said truck adapted to be engaged by said body side bearings.

11. In a railway car comprising a plurality of bodies, a truck for supporting the adjacent ends of said bodies, and a side bearing for said bodies between said bodies and said truck, said side bearing comprising members movable independently of each other and having bearing faces, each of which faces is adapted to be engaged by one of said bodies.

12. In a railway car comprising a plurality of bodies, a truck for supporting the adjacent ends of said bodies, a side bearing between said bodies and truck, said side bearing comprising a plurality of yieldable shoe members adapted to be engaged by said bodies.

In testimony whereof, I affix my signature.

FELIX KOCH.